United States Patent
Gotoh et al.

(10) Patent No.: US 7,640,268 B2
(45) Date of Patent: Dec. 29, 2009

(54) POSITIONAL INFORMATION MANAGEMENT SYSTEM, POSITIONAL INFORMATION MANAGEMENT METHOD, RECORDING MEDIUM, AND MOBILE TERMINAL

(75) Inventors: Hideo Gotoh, Kanagawa (JP); Takashi Masuya, Kanagawa (JP); Shigeo Iwata, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 515 days.

(21) Appl. No.: 10/411,210

(22) Filed: Apr. 11, 2003

(65) Prior Publication Data
US 2003/0217070 A1    Nov. 20, 2003

(30) Foreign Application Priority Data
Apr. 15, 2002    (JP)    ............................. 2002-112361

(51) Int. Cl.
*G06F 7/00*    (2006.01)
*G06F 17/00*    (2006.01)

(52) U.S. Cl. .................... 707/104.1; 701/200; 701/201; 701/206; 701/207

(58) Field of Classification Search .................... 707/1
See application file for complete search history.

(56) References Cited

U.S. PATENT DOCUMENTS

| | | | |
|---|---|---|---|
| 5,652,570 A | 7/1997 | Lepkofker | |
| 6,005,513 A * | 12/1999 | Hardesty | 342/357.09 |
| 6,144,917 A * | 11/2000 | Walters et al. | 701/204 |
| 6,252,544 B1 * | 6/2001 | Hoffberg | 342/357.1 |
| 6,421,606 B1 * | 7/2002 | Asai et al. | 701/209 |
| 6,421,608 B1 * | 7/2002 | Motoyama et al. | 701/213 |
| 6,470,263 B2 * | 10/2002 | Ito et al. | 701/201 |
| 6,496,778 B1 * | 12/2002 | Lin | 701/215 |
| 6,857,016 B1 * | 2/2005 | Motoyama et al. | 709/224 |
| 6,876,926 B2 * | 4/2005 | Kirkland et al. | 701/220 |
| 6,883,747 B2 * | 4/2005 | Ratkovic et al. | 244/3.15 |
| 6,999,779 B1 * | 2/2006 | Hashimoto | 455/456.2 |
| 2001/0042001 A1 * | 11/2001 | Goto et al. | 705/9 |
| 2002/0022924 A1 * | 2/2002 | Begin | 701/207 |
| 2003/0018430 A1 * | 1/2003 | Ladetto et al. | 701/217 |
| 2003/0045998 A1 * | 3/2003 | Medl | 701/207 |
| 2003/0099375 A1 * | 5/2003 | Sefcik | 382/103 |
| 2003/0149528 A1 * | 8/2003 | Lin | 701/214 |

(Continued)

FOREIGN PATENT DOCUMENTS

GB    2 322 248    8/1998

(Continued)

*Primary Examiner*—John R. Cottingham
*Assistant Examiner*—Michael Pham
(74) *Attorney, Agent, or Firm*—Oblon, Spivak, McClelland, Maier & Neustadt, L.L.P.

(57) ABSTRACT

A worker transfers GPS signals to a communication system at each node of traveling using a cellular phone terminal, and the communication system specifies the position of the cellular phone terminal and notifies positional information to a management system. When the cellular phone terminal cannot receive GPS signals or is outside a range accessible to the communication system, it starts recording acceleration data using an accelerometer. When a communicable state is recovered, the cellular phone terminal sends GPS signals and the recorded acceleration data to the communication system. A management computer determines whether the position notified by the communication system is an intended node. If the notified position is not an intended node, the management computer derives the position of the intended node using the acceleration data, and predicts the travel route based on the node position.

10 Claims, 7 Drawing Sheets

U.S. PATENT DOCUMENTS

| | | | |
|---|---|---|---|
| 2003/0163524 A1* | 8/2003 | Gotoh et al. | 709/203 |
| 2003/0182053 A1* | 9/2003 | Swope et al. | 701/207 |
| 2003/0206100 A1* | 11/2003 | Richman et al. | 340/506 |
| 2004/0030670 A1* | 2/2004 | Barton | 707/1 |
| 2004/0260669 A1* | 12/2004 | Fernandez | 707/1 |
| 2005/0091184 A1* | 4/2005 | Seshadri et al. | 707/1 |
| 2005/0234851 A1* | 10/2005 | King et al. | 707/1 |
| 2005/0246314 A1* | 11/2005 | Eder | 707/1 |
| 2006/0030334 A1 | 2/2006 | Hashimoto | |
| 2006/0259240 A1 | 11/2006 | Hashimoto | |

FOREIGN PATENT DOCUMENTS

| | | |
|---|---|---|
| JP | 10-232992 | 9/1998 |
| JP | 2002-015102 | 1/2002 |
| JP | 2002-48589 | 2/2002 |

\* cited by examiner

POSITIONAL INFORMATION MANAGEMENT SYSTEM, POSITIONAL INFORMATION MANAGEMENT METHOD, RECORDING MEDIUM, AND MOBILE TERMINAL

BACKGROUND OF THE INVENTION

1. Field of the Invention

The present invention relates to a positional information management system and a positional information management method for use in managing positional information of a worker who moves from place to place toward the visiting destination where he/she has tasks to do, and a recording medium and a mobile terminal therefor.

2. Description of the Related Art

In many cases, a worker who goes out from his/her office to perform his/her job writes a daily report in which the contents of works he/she has done at the visiting place are put down. In some cases, the location of the visiting place and how to travel are also included in this daily report, so that transportation costs may be paid back to the worker based on the reported information. For this purpose, the worker has to report to the company the means of transportation he/she utilized and the stations he/she got on/off the transportation.

For this need, the worker may utilize a positional information providing service offered by a communication service company, by using his/her cellular phone, etc. Specifically, the worker regularly sends his/her current position to the company's management system on this positional information providing service. Then, the worker specifies the route he/she took including the utilized means of transportation and the stations to get on/off the transportation based on the positional information sent to the system, and generates the daily report based on the specified information. By utilizing such a positional information providing service, the worker can avoid the bothersome labor of recording the stations and transportation.

There is no doubt that the worker can accurately specify the route he/she took if he/she records the positional information in detail. However, in the case where the worker sends the positional information acquired by the positional information providing service to his/her company's management system through the positional information providing service, charges are required for the services done and data communication. Therefore, there is a problem that the more detailed the positional information gets, the more expensive the charges become.

Furthermore, in some cases, the positional information providing service can not be accessed from indoor environments such as inside the subways and buildings where communication condition is poor. In these cases, the positional information can not be properly recorded and the route the worker took can not be accurately traced.

The present invention was made to solve the above-described problems, and an object of the present invention is to provide a positional information management system, a positional information management method, and a mobile terminal which are capable of efficiently managing positional information of a worker who moves from place to place toward the visiting destination where he/she has tasks to do.

SUMMARY OF THE INVENTION

To achieve the above object, a positional information management system according to a first aspect of the present invention is a positional information management system comprising: a mobile terminal which acquires acceleration data at a predetermined position; a management server which is connected to the mobile terminal through a network and predicts a travel route of the mobile terminal; and a communication system which specifies a current position of the mobile terminal and sends positional data representing the specified current position to the management server, wherein the management server:

is connected to a positional data storage unit which stores positional data representing that the mobile terminal is at a predetermined position, which is sent from the communication system in association with a reception time at which the positional data is received, and to an acceleration data storage unit which stores an acceleration log representing acceleration data in time series, which is sent from the mobile terminal in association with a reception time at which the acceleration log is received;

selects positional data for two positions which are recorded adjacently time-wise in the positional data storage unit, and which are included in a travel route which is a target of prediction;

extracts an acceleration log whose reception time corresponds to a reception time of any of the selected positional data; and predicts a travel route of the mobile terminal based on the selected positional data and the extracted acceleration log.

The management server may further be connected to a motion pattern data storage unit which stores a velocity pattern and an acceleration pattern for each means of transportation, and may specify means of transportation used for traveling between the two positions, by deriving an average travel velocity between the two positions based on the selected positional data and their reception times and then comparing the average travel velocity with the velocity pattern stored in the motion pattern data storage unit, or by comparing the extracted acceleration log with the acceleration pattern stored in the motion pattern data storage unit.

To achieve the above object, a positional information management method according to a second aspect of the present invention is a positional information management method for predicting a travel route from a notification point at which a mobile terminal should notify that it is at the point, based on positional data representing a current position of the mobile terminal which acquires acceleration data at a predetermined position, and an acceleration log representing acceleration data in time series acquired by the mobile terminal, the positional data and the acceleration log being notified through a predetermined network, the method comprising:

a step of storing positional data and an acceleration log in association with times at which they are notified;

a step of selecting positional data for two positions which are recorded adjacently time-wise, and which are included in a travel route which is a target of prediction;

a step of extracting an acceleration log corresponding to any of the selected positional data; and a step of predicting a travel route based on the selected positional data and the extracted acceleration log.

According to this method, it is possible to predict a travel route by complementing the positional data with the acceleration log, even in a case where stored positional data does not represent a notification point at which the mobile terminal should notify that it is at the point.

The positional information management method may further comprise a step of storing map data representing predetermined means of transportation, and places to get on and off the means of transportation, the notification point may include the places to get on and off the means of transportation, and the step of predicting the travel route may include specifying means of transportation which includes the notification point in its running course, by using the map data.

Because of these features, it is possible to specify the station, etc. and the means of transportation used for traveling.

The step of predicting the travel route may include a step of specifying the notification point based on the extracted acceleration log corresponding to the selected positional data and the selected positional data, in a case where any of the selected positional data is not positional data representing the notification point, and a step of predicting the travel route based on positional data representing the notification point or based on the extracted acceleration log.

According to this method, there might be places where positional information can not be acquired or positional information can not be sent to the management system due to the communication condition. In this case, the position recorded in the positional data storage means differs from the notification point at which the mobile terminal should notify its presence. In this case too, a travel route can be predicted because the position of the notification point is specified based on the acceleration log and the positional data. The step of specifying the notification point may specify the notification point by:

deriving a travel distance based on the extracted acceleration log; and searching for the notification point that exists within a radius of the derived travel distance from the position represented by the selected positional data from the map data.

According to this method, even in a case where positional information can not be sent to the management system or in other such cases, the notification point at which the mobile terminal should notify its presence can be predicted.

The positional data management method may further comprise a step of storing a velocity pattern for each predetermined means of transportation, and the step of predicting the travel route may specify means of transportation by calculating an average travel velocity between the two positions based on the selected positional data and the times at which the positional data are notified, and by comparing the average travel velocity with the velocity pattern.

According to this method, a travel route can be predicted more accurately, since different means of transportation have different velocity patterns.

The positional information management method may further comprise a step of storing an acceleration pattern for each predetermined means of transportation, and the step of predicting the travel route may specify means of transportation by comparing the extracted acceleration log with the acceleration pattern.

According to this method, a travel route can be predicted more accurately, since different means of transportation have different acceleration patterns.

A program for controlling a computer to execute all or a part of the above-described steps can be provided by recording the program in a computer-readable recording medium, or by carrying the program on a carrier wave which can be run on a computer.

To achieve the above object, a mobile terminal according to a third aspect of the present invention is a mobile terminal which comprises: an acceleration measuring unit which senses an acceleration and measures an acceleration log; a positional information acquiring unit which acquires predetermined positional information; a control unit which controls the acceleration measuring unit and the positional information acquiring unit; and a storage unit which stores predetermined data, and which sends predetermined information to a management system for managing the positional information, wherein the control unit:

determines whether or not data for specifying a position of the mobile terminal can be acquired by the positional information acquiring unit;

stores an acceleration log measured by the acceleration measuring unit in the storage unit, in a case where the positional information can not be acquired; and sends data regarding the position of the mobile terminal acquired by the positional information acquiring unit and the acceleration log stored in the storage unit to the management system, in a case where acquisition of the positional information becomes possible.

According to this structure, the management system can manage the positional information of the mobile terminal speedily.

The control unit may further derive a variable time cycle as a function of an acceleration measured by the acceleration measuring unit, and send data regarding the position of the mobile terminal to the management system in accordance with the variable time cycle.

With these features, data regarding the position of the mobile terminal can be sent to the management system efficiently, in accordance with the travel condition of the mobile terminal.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENTS

In the present embodiment, there will be explained a positional information management system, a positional information management method, a recording medium, and a mobile terminal which are to be used in order to manage business trips of a worker who moves from place to place toward a plurality of visiting destinations where the worker has tasks to perform. In the present embodiment, the worker is supposed to visit a plurality of business partners' places by utilizing various means of transportation, while reporting positional information to his/her company. The positional information is used when a daily report in which how to travel from one business partner's place to another is put down is to be generated. Payback of the transportation costs, etc. will be done based on this daily report.

Figure 1:
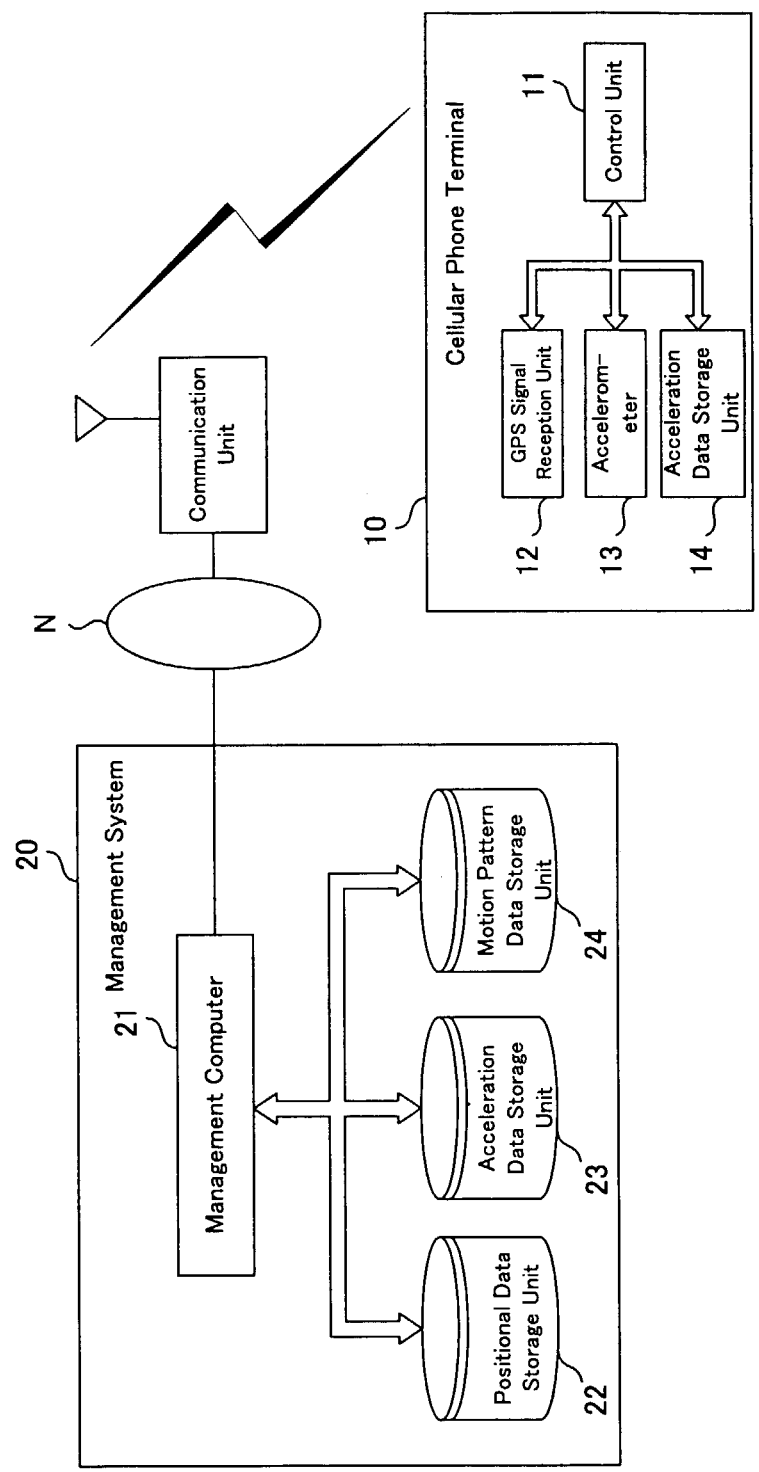
FIG. 1 is a schematic diagram showing a system according to one embodiment of the present invention.

In the present embodiment, a cellular phone terminal 10 as a mobile terminal shown in FIG. 1 is offered to the worker. The worker visits the business partners' places, etc. carrying the cellular phone terminal 10. A terminal identifier for identifying each terminal is assigned to the cellular phone terminal 10. As shown in FIG. 1, the cellular phone terminal 10 comprises a GPS signal reception unit 12, an accelerometer 13, an acceleration data storage unit 14, and a control unit 11 for controlling these units. Further, the cellular phone terminal 10 has a notification button (not shown) for performing a later-described notification process.

The control unit 11 controls the GPS signal reception unit 12 and the accelerometer 13, and has a function for performing wireless communication with a later-described communication system 30. The cellular phone terminal 10 further has a terminal function for transferring GPS signals received by the GPS signal reception unit 12 to the later-described communication system 30 for enabling utilization of a positional information providing service offered by the communication system 30, in order to specify its position. The control unit 11 has a function as a clock for indicating the current time.

The GPS signal reception unit 12 receives a radio wave (a GPS signal) from a predetermined GPS (Global Positioning System) satellite. The accelerometer 13 measures the acceleration applied to the cellular phone terminal 10. The acceleration data storage unit 14 stores data on the acceleration applied to the cellular phone terminal 10 in time series.

The communication system 30 is a system including a wireless base station for sending and receiving predetermined information to and from the cellular phone terminal 10. The communication system 30 specifies the position of the cellular phone terminal 10 based on GPS signals sent from the cellular phone terminal 10, and relays communications between a management system 20 and the cellular phone terminal 10. The communication system 30 is connected to the management system 20 via a network N. A cellular phone net is used as the network N in this embodiment.

According to the present embodiment, the communication system 30 specifies the position of the cellular phone terminal 10 by using GPS signals. Specifically, the cellular phone terminal 10 transmits GPS signals received from a plurality of GPS satellites to the communication system 30. The communication system 30 specifies the position of the cellular phone terminal 10 using the GPS signals from the plurality of GPS satellites transmitted from the cellular phone terminal 10 in accordance with, for example, triangulation. However, the GPS signals to be used are not limited to signals from three GPS satellites that are necessary for triangulation, but an arbitrary number of GPS signals can be used.

The management system 20 is a computer system for managing the positional information of the -worker. The management system 20 performs various processes while exchanging predetermined information with the cellular phone terminal 10 via the communication system 30. The management system 20 stores positional information sent thereto and specifies the travel route the worker took. The management system 20 includes a management computer 21, as shown in FIG. 1.

The management computer 21 includes control means (CPU), storage means (a RAM, a ROM, a hard disk, etc.), input/output means, and data sending/receiving means (all of which are not illustrated). The management computer 21 executes a positional information management program for performing later-described steps for positional information management (a step of extracting positional data of two positions, a step of extracting acceleration logs, a step of predicting a travel route, etc.).

This program is recorded on an arbitrary computer-readable recording medium such as a flexible disk, a CD-ROM, etc. to be served for use. Or, this program may be transmitted on a carrier wave which can be run on a computer, so that the program may be used. Thereby, the management computer 21 functions as means for extracting positional data of two positions, means for extracting acceleration logs, means for predicting a travel route, etc.

A positional data storage unit 22, an acceleration data storage unit 23, and a motion pattern data storage unit 24 are connected to the management computer 21.

Figure 2:
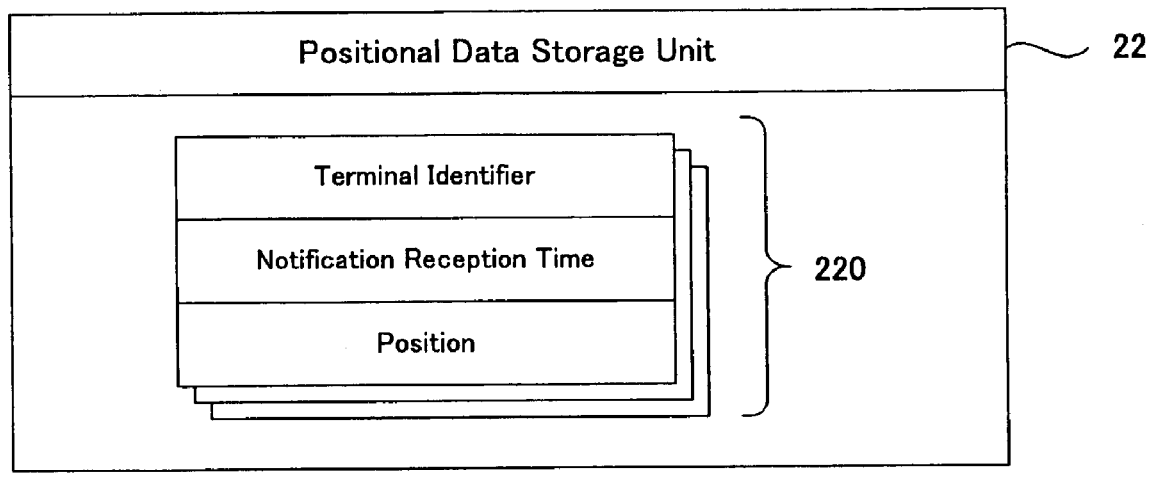
FIG. 2 is an explanatory diagram showing data stored in a positional data storage unit.

As shown in FIG. 2, the positional data storage unit 22 stores positional data 220 regarding the position of the cellular phone terminal 10. The positional data 220 is recorded when notification of positional information is received from the cellular phone terminal 10. In the present embodiment, the positional data 220 is generated for each notification reception, and includes data on a terminal identifier, a notification reception time, and a position.

Data regarding an identifier assigned to the cellular phone terminal 10 for specifying the worker who has sent the positional information is recorded in the data area for terminal identifier. In the present embodiment, the phone number of the cellular phone terminal 10 is used as the terminal identifier.

Data regarding the time at which notification of the positional information is received from the cellular phone terminal 10 is recorded in the data area for notification reception time.

Data regarding the position of the worker at the time of notification is recorded in the data area for position. The data regarding the position of the worker is positional data obtained based on GPS signals which are received by the communication system 30 from the cellular phone terminal 10. In the present embodiment, longitude/latitude data is used as the positional data.

Figure 3:
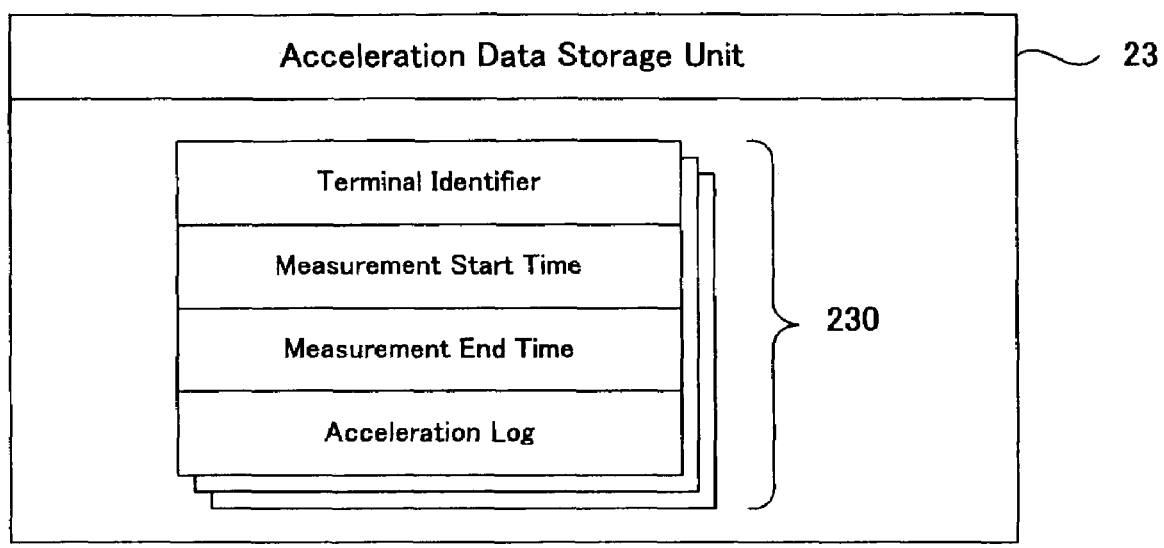
FIG. 3 is an explanatory diagram showing data stored in an acceleration data storage unit.

As shown in FIG. 3, the acceleration data storage unit 23 stores acceleration data 230 regarding logs of accelerations applied to the cellular phone terminal 10 of the worker. The acceleration data 230 is recorded when acceleration data is received from the cellular phone terminal 10. In the present embodiment, the acceleration data 230 is structured to include data regarding a measurement start time, a measurement end time, and an acceleration log in association with the terminal identifier.

Data regarding an identifier assigned to the cellular pone terminal 10 which has sent the acceleration data is recorded in the data area for terminal identifier.

Data regarding the time at which the cellular phone terminal 10 starts measuring the acceleration is recorded in the data area for measurement start time. In the present embodiment, the cellular phone terminal 10 starts measuring the acceleration in a case where the cellular phone terminal 10 can not receive GPS signals when the worker tries to perform the process for notifying the positional information, or in a case where the cellular phone terminal 10 can not communicate with the communication system 30.

Data regarding the time at which the cellular phone terminal 10 of the worker finishes measuring the acceleration is recorded in the data area for measurement end time. In the present embodiment, the cellular phone terminal 10 finishes measuring the acceleration in a case where the cellular phone terminal 10 becomes able to receive GPS signals, and communication with the communication system 30 is recovered.

Data regarding the acceleration log received from the cellular phone terminal 10 is recorded in the data area for acceleration log. This acceleration log includes changes in the acceleration from the measurement start time to the measurement end time.

Figure 4:
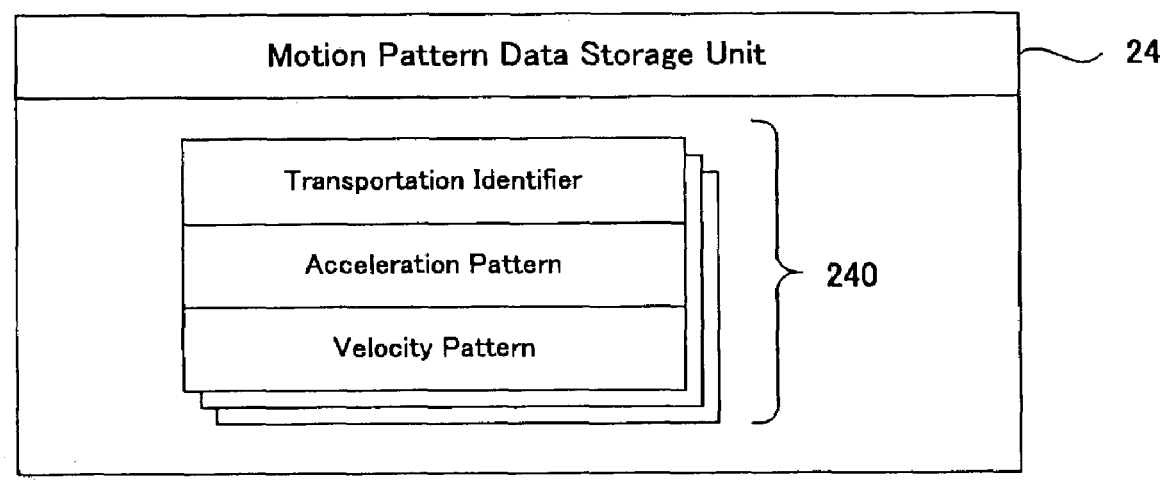
FIG. 4 is an explanatory diagram showing data stored in a motion pattern data storage unit.

As shown in FIG. 4, the motion pattern data storage unit 24 pre-stores motion pattern data 240 for specifying the means of transportation utilized by the worker. The motion pattern data 240 indicates the characteristics of the motion pattern of each means of transportation. In the present embodiment, the motion pattern data 240 is structured to include data regarding a transportation identifier, an acceleration pattern, and a velocity pattern for each kind of transportation.

Data regarding an identifier for specifying means of transportation is stored in the data area for transportation identifier. The means of transportation includes travel means such as train, bus, airplane, etc.

Data regarding an acceleration pattern of each means of transportation is stored in the data area for acceleration pattern. The acceleration pattern is represented by, for example, an acceleration time, etc. The acceleration time of a train is set longer than that of a bus.

Data regarding a velocity pattern of each means of transportation is stored in the data area for velocity pattern. The velocity pattern is represented by, for example, an average velocity, a velocity range, a running time interval, etc. For example, the velocity range of a train is set wider than that of a bus. Further, since a bus may stop at a traffic light, the running time interval of a train is set longer than that of a bus.

The management system 20 has map data storage means (not shown) for storing map data indicative of predetermined nodes (stations, bus stops, etc.) and each means of transportation. The management computer 21 of the management system 20 searches out a corresponding node based on predetermined positional data and/or an acceleration log received from the cellular phone terminal 10, and extracts the name of a possible means of transportation.

The processes for managing the positional information of the worker with the use of the system structured as described above, will now be explained. Explanation will be made for a notification process and for a route prediction process separately.

(Notification Process)

Figure 5:
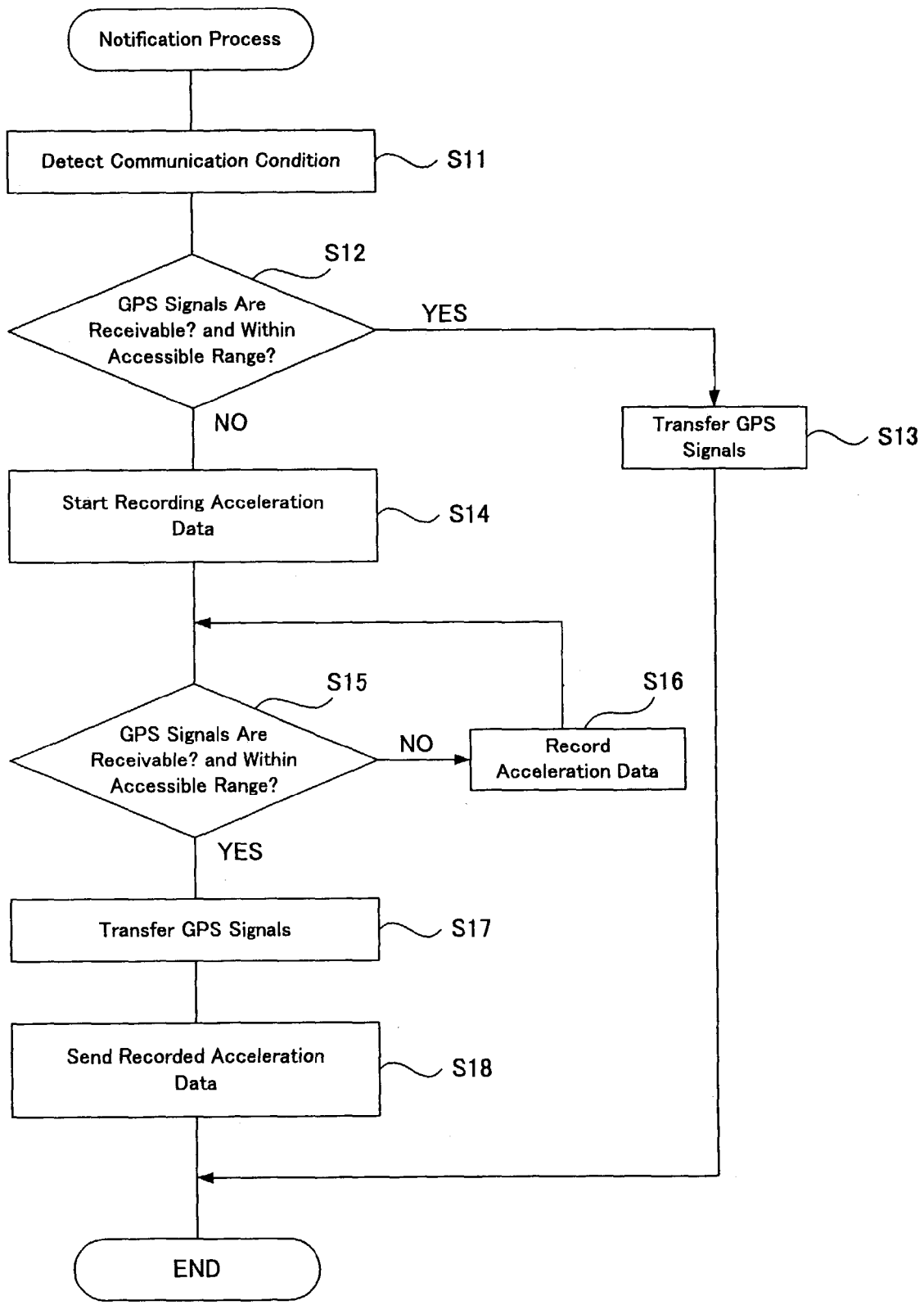
FIG. 5 is a flowchart showing a part of a process flow according to one embodiment of the present invention.

First, a notification process will be explained with reference to FIG. 5. This process is executed by the control unit 11 of the cellular phone terminal 10 in a case where the worker pushes the notification button set on the cellular phone terminal 10.

While on duty outside, the worker pushes the notification button at each point (hereinafter referred to as "node") at which the worker should notify that he/she is at the point. A node means a marking point in the travel course, and includes a place such as a station, etc. at which the worker uses a transportation service. The node includes the position of a departure station, the position of an arrival station, the position of a bus stop from which the worker gets on a bus, the position of a business partner's place, etc.

When the notification button is pushed by the worker, the cellular phone terminal 10 detects a communication condition (step S11). This communication condition includes a condition for receiving GPS signals and a condition for communicating with the communication system 30. Specifically, the control unit 11 determines whether or not the GPS signal reception unit 12 has received GPS signals, and whether or not the cellular phone terminal 10 is within a range accessible to the communication system 30.

In a case where GPS signals are receivable and the cellular phone terminal 10 is within a range accessible to the communication system 30 (step S12; Yes), the control unit 11 transfers the GPS signals received by the GPS signal reception unit 12 to the communication system 30 (step S13). Data regarding the terminal identifier is affixed to the GPS signals to be transferred.

The communication system 30 specifies the position of the cellular phone terminal 10 based on the received GPS signals, generates data (positional data) regarding the specified position. Then, the communication system 30 sends notification data including the generated positional data and the terminal identifier to the management computer 21 of the management system 20 through the network N. The management computer 21 which has received the notification data adds a notification reception time thereto, and stores the terminal identifier and the positional data in the positional data storage unit 22.

On the contrary, in a case where the cellular phone terminal 10 can not receive GPS signals, or in a case where the cellular phone is outside the range accessible to the communication system 30 (step S12; No), the cellular phone terminal 10 measures the acceleration by the accelerometer 13, and starts recording data on the measured acceleration (step S14). Specifically, first, the control unit 11 obtains the current time by the built-in clock, and records the obtained current time as a measurement start time in the acceleration data storage unit 14. Next, the control unit 11 starts recording data (acceleration log) on the acceleration measured by the accelerometer 13 in the acceleration data storage unit 14.

The control unit 11 continues to monitor the reception condition for GPS signals and the communication condition with the communication system 30, and determines again whether or not the GPS signal reception unit 12 has received GPS signals, and whether or not the cellular phone terminal 10 is within a range accessible to the communication system 30 (step S15). In a case where the GPS signal reception unit 12 has still been unable to receive GPS signals or in a case where the cellular phone terminal 10 is still outside the range accessible to the communication system 30 (step S15; No), the measuring of the acceleration by the accelerometer 13 and recording of the data are to be continued (step S16).

On the contrary, in a case where the GPS signal reception unit 12 becomes able to receive GPS signals and the cellular phone terminal 10 enters the range accessible to the communication system 30 (step S15; Yes), the control unit 11 transfers the GPS signals received by the GPS signal reception unit 12 to the communication system 30 (step S17). In this case, the communication system 30 generates positional data regarding the position of the cellular phone terminal 10 based on the received GPS signal, and sends the generated positional data to the management computer 21 of the management system 20 through the network N. Then, the management computer 21 stores the terminal identifier and the positional data together with the notification reception time in the positional data storage unit 22.

Further, the control unit 11 sends the acceleration data stored in the acceleration data storage unit 14 to the management system 20 through the communication system 30 and the network N (step S18). The acceleration data includes data on the measurement start time and the acceleration log.

The management computer 21 which has received the acceleration data stores the acceleration log in the acceleration data storage unit 23 in association with the terminal identifier of the cellular phone terminal 10 which has made the notification. Further, the management computer 21 records the time at which it receives the acceleration log as the measurement end time. Thus, the process performed when a notification is made is completed.

(Travel Route Prediction Process)

When the worker returns to his/her office from the business partner's place, the worker makes a daily report including a report on the business trip, by using the management system 20. Specifically, the worker inputs a date on which the daily report is to be made (date on which the worker has gone on a business trip), and the terminal identifier of the worker's cellular phone terminal 10, by using the input means of the management system 20. Then, the management computer 21 extracts all the positional data 220 that include the input date and terminal identifier of the worker's terminal.

Figure 6:
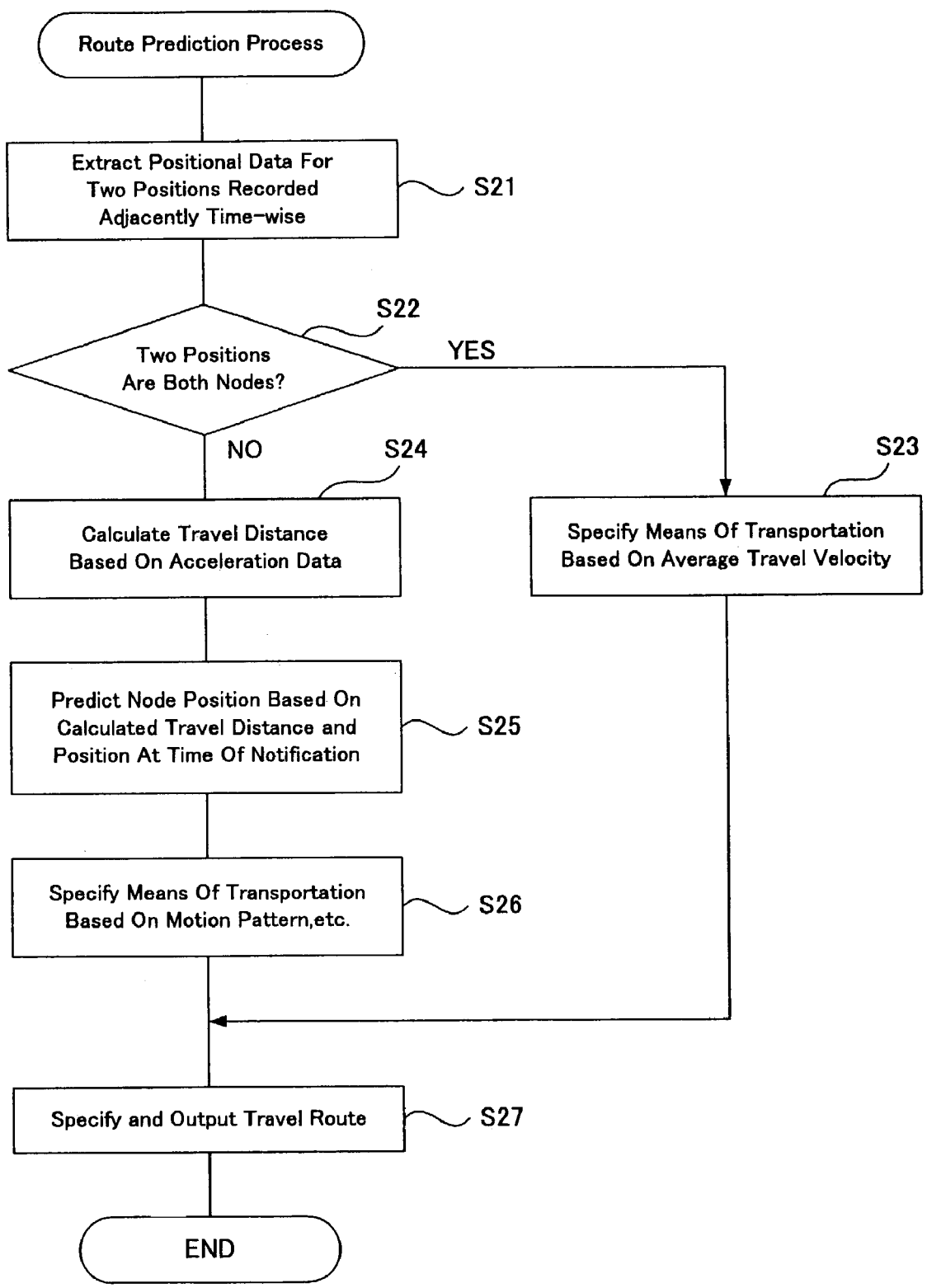
FIG. 6 is a flowchart showing another part of the process flow according to one embodiment of the present invention.

The management computer 21 performs a process for predicting the travel route of the worker with the use of the extracted positional data 220. This process will be explained with reference to FIG. 6. The management computer 21 specifies positional data 220 for two positions, notifications from which are received adjacently time-wise, and which are included in the prediction-target travel route (step S21).

Next, the management computer 21 determines whether or not the positions represented by the specified positional data 220 are the positions of intended nodes (step S22). A position of an intended node is a notification point at which the worker is meant to notify his/her presence, and a place where the worker pushes the notification button. In a case where the communication condition at a node is not fine, the cellular phone terminal 10 monitors the communication condition and finally makes a notification when the communication condition becomes better enough to enable communication with the communication system 30, as described in the explanation of step S17. In such a case, the position of an intended node and the position represented by the positional data 220 do not correspond. In the present embodiment, no acceleration data is recorded in a case where the communication condition at a node is fine. Therefore, the determination for checking correspondence with the position of an intended node is done in accordance with whether or not there is acceleration data related to the position represented by the specified positional data 220. Specifically, the management computer 21 checks whether or not there is any acceleration data 230 indicative of a measurement end time corresponding to the notification reception time included in the positional data 220, among the acceleration data 230 stored in association with the terminal identifier which is the target for making the daily report.

In a case where no acceleration data 230 related to the positional data 220 for the two positions is stored in the acceleration data storage unit 23 and thus the positional data 220 which are the travel route prediction target are both positional data indicative of nodes (step S22; Yes), the management computer 21 specifies the kind of the means of transportation (step S23). Specifically, the management computer 21 derives the distance between the two nodes. Then, the management computer 21 divides the derived distance by the time required for traveling from one of the nodes to the other, and derives the average travel velocity. Then, the management computer 21 specifies the kind of the means of transportation corresponding to the derived average travel velocity, based on the motion pattern data stored in the motion pattern data storage unit 24. In a case where the average travel velocity is equal to or less than a predetermined value, the management computer 21 determines that the travel between the two positions has been on foot, or that no substantial distance has been traveled. In this case, the management computer 21 does not specify the kind of the means of transportation.

On the contrary, in a case where acceleration data 230 related to the positional data 220 is stored in the acceleration data storage unit 23 and thus the notification point is not the intended node (step S22, No), the management computer 21 predicts the position of the intended node. Specifically, the management computer 21 derives a distance traveled between the acceleration measurement start time and the measurement end time based on the acceleration data 230 (step S24). Here, the management computer 21 derives the travel distance by twice integrating the acceleration log of the acceleration data 230 with respect to time.

Next, the management computer 21 predicts the position of the intended node based on the derived travel distance and the position at the measurement end time (notification reception time) indicated by the position data 220 (step S25). Specifically, the management computer 21 searches for a position that might be a node (for example, a station, a bus stop, etc.) and that exists within a circle whose center is at the position indicated by the positional data 220 and whose radius is the derived travel distance from the map data. The map data is stored in the map data storage means (not shown) provided in the management system 20, as described above.

Further, the management computer 21 specifies the kind of the means of transportation (step S26). Specifically, the management computer 21 compares the acceleration log stored in the acceleration data storage unit 23 and the velocity derived from this acceleration log with the acceleration pattern and the velocity pattern stored in the motion pattern data storage unit 24, and thus specifies the kind of the means of transportation. In a case where the period of time in which the measurement has been performed is short, the management computer 21 may specify the kind of the means of transportation based on an average travel velocity derived from the distance between nodes, likewise step S23.

Next, the management computer 21 specifies the travel route of the worker and outputs the specified travel route (step S27). Specifically, the management computer 21 extracts the name of the means of transportation which includes in its running course station names (or bust stop names, etc.) corresponding to the positions of the intended nodes (notification points) from the map data. Further, in a case where there are a plurality of means of transportation that include both the nodes, the management computer 21 specifies the travel route by comparing the kind of the means of transportation specified based on the acceleration log or the average travel velocity, with the name of the means of transportation extracted from the map data. Then, the management computer 21 outputs the specified travel route to the output means of the management system 20 as a candidate. Thus, the process for predicting the travel route between specific two positions is completed. This travel route prediction process is performed for all the positional data 220 which are the targets of making the daily report.

The worker confirms the candidate of the travel route which is output. In a case where the worker confirms the candidate to be correct, the candidate is settled as the correct travel route based on the confirmation information. Then, the daily report is made based on this travel route.

As explained above, in the present embodiment, the following effects can be achieved.

(1) In the above embodiment, in a case where the cellular phone terminal 10 can not receive GPS signals, or in a case where the cellular phone terminal 10 is outside the range accessible to the communication system 30, the cellular phone terminal 10 starts recording acceleration data indicative of the acceleration measured by the accelerometer 13. Therefore, even in a case where the communication condition of the cellular phone terminal 10 is not fine, the travel route of the worker can be predicted using the acceleration data.

(2) In the above embodiment, in a case where the notification button is pushed at each node, the cellular phone terminal 10 sends positional data to the management system 20. Therefore, it is possible to provide positional information to the management system 20 efficiently by reducing the communication frequency.

(3) In the above embodiment, in a case where the communication condition at the time the notification button is pushed is not fine, the control unit 11 monitors the condition for receiving GPS signals and the condition for communicating with the communication system 30. Then, when the communication condition is improved, thus GPS signals can be received, and communication with the communication system 30 becomes possible, the control unit 11 sends the acceleration data stored in the acceleration data storage unit 14 to the management system 20 through the communication system 30 and the network N. Therefore, the cellular phone terminal 10 only needs to record acceleration data during a period of time in which the communication condition is not desirable. Accordingly, the storage capacity of the acceleration data storage unit 14 can be reduced.

(4) In the above embodiment, acceleration data 230 regarding a log of an acceleration applied to the cellular phone terminal 10 is stored in the acceleration data storage unit 23. The acceleration data 230 is data on an acceleration during a period of time in which the communication condition remains undesirable since the notification button of the cellular phone terminal 10 is pushed. Therefore, the management computer 21 can predict the position of the intended node using the positional data 220 stored in the positional data storage unit 22 and the acceleration data 230. Accordingly, a candidate of the travel route can be specified using the predicted nodes. By using the candidate of the travel route, the worker can efficiently make a daily report or business trip report.

(5) In the above embodiment, motion pattern data 240 for specifying means of transportation is stored in the motion pattern data storage unit 24. The motion pattern data 240 includes data on a transportation identifier, an acceleration pattern, and a velocity pattern for each means of transportation. Therefore, means of transportation can be specified based on the acceleration log of the acceleration data 230 and a calculated average travel velocity.

The present invention is not limited to the above-described embodiment, but can be arbitrarily applied and modified.

For example, in the above embodiment, as has been explained, in a case where the cellular phone terminal 10 can not receive GPS signals or in a case where the cellular phone terminal 10 is outside the range accessible to the communication system 30, the cellular phone terminal 10 starts recording acceleration data. Instead, the cellular phone terminal 10 may record acceleration data all the time. Thereby, it is possible to specify the means of transportation more securely by using the motion pattern data 240 stored in the motion pattern data storage unit 24.

Figure 7:
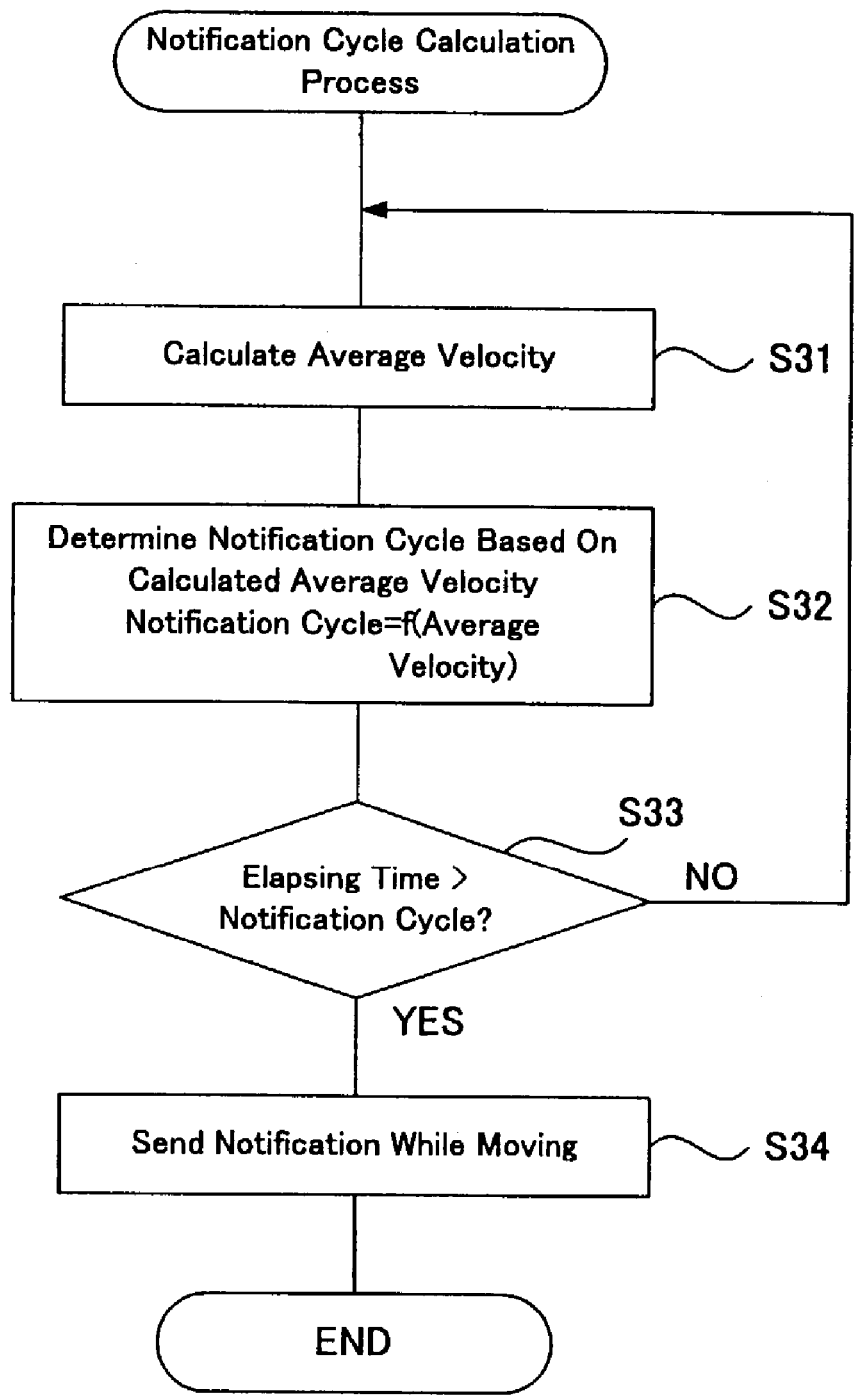
FIG. 7 is a flowchart showing a process flow according to another embodiment of the present invention.

As has been explained, in the above embodiment, when the notification button is pushed at each node, the cellular phone terminal 10 sends positional data to the management system 20. In addition, the cellular phone terminal 10 may send positional data to the management system 20 while on the move. This modification example will now be explained with reference to FIG. 7.

In this modification example, the control unit 11 is supposed to measure the acceleration by the accelerometer 13 all the time and record data representing the measured acceleration in the acceleration data storage unit 14. The control unit 11 calculates the average velocity by once integrating the acceleration measured by the accelerometer 13 with respect to time (step S31).

Next, the control unit 11 determines a notification cycle according to which positional data should be notified to the management system 20, in accordance with the average velocity (step S32). In this case, the control unit 11 derives the notification cycle using a function in which the average velocity is a parameter. That is, the average velocity is calculated as a function of the acceleration, and the notification cycle is calculated as a function of the average velocity. Here, as a function for calculating the notification cycle, a function according to which the notification cycle becomes shorter as the average velocity increases, is used. In this way, the control unit 11 can calculate the notification cycle as the function of the acceleration, based on the measured acceleration Next, the control unit 11 compares the time which has elapsed from the latest notification time with the calculated notification cycle (step S33). In a case where the elapsing time is shorter than the notification cycle (step S33; No), the control unit 11 repeats steps S31 to S33.

On the contrary, in a case where the elapsing time becomes equal to or greater than the notification cycle (step S33; Yes), the control unit 11 sends a notification signal for requesting forwarding of positional information, to the communication system 30 while on the move (step S34). This notification signal includes GPS signals -received by the GPS signal reception unit 12. The communication system 30, which has received the notification signal sent while on the move, generates positional data of the cellular phone terminal 10 based on the received GPS signal, and forwards the generated positional data to the management system 20.

Since the management computer 21 of the management system 20 can specify an intermediate position between nodes by this notification sent while on the move, the management computer 21 can specify the worker's travel route more securely.

Further, since a function according to which the notification cycle becomes shorter as the average velocity increases is used, in a case where the worker moves at a high velocity, notifications while the worker is on the move are sent frequently. On the other hand, while the worker is stopping or moving at a low velocity, notifications while the worker is on the move become less frequent. Therefore, positional information can be recorded in accordance with a predetermined travel distance. This enables efficient data recording.

According to the explanation of the above-described embodiment, in a case where the cellular phone terminal 10 becomes able to receive GPS signals and in a case where the cellular phone terminal 10 enters the range accessible to the communication system 30, the control unit 11 sends the acceleration data stored in the acceleration data storage unit 14 to the management system 20 through the communication system 30 and the network N. Instead of this, the worker may directly transfer the acceleration data stored in the acceleration data storage unit 14 of the cellular phone terminal 10 to the acceleration data storage unit 23 of the management computer 21 when the worker returns to the office. Due to this, communication costs can be reduced.

According to the explanation of the above-described embodiment, the communication system 30 specifies the position of the cellular phone terminal 10 based on, for example, the principle of triangulation using GPS signals from a plurality of GPS satellites transferred from the cellular phone terminal 10. However, the position specifying method using GPS signals is not limited to this, but is arbitrary. For example, a so-called D-GPS (Differential-Global Positioning System) for correcting the measured position based on errors with respect to the GPS satellites may be employed. Further, a position specifying function of the wireless base station constituting the communication system 30 may be additionally used, so that the position of the cellular phone terminal 10 can be specified more precisely.

As explained above, according to the present invention, it is possible to efficiently manage the positional information of a worker who moves from place to place toward visiting destinations where he/she has works to do. Further, the worker can carry out his/her works efficiently because the worker can use the positional information which he/she has sent, when making a daily report.

The above-described embodiments are intended to illustrate the present invention, not to limit the scope of the present invention. Other than the disclosed embodiments, various embodiments and various usages will become apparent to those skilled in the art upon studying the above described embodiments. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2002-112361 filed on Apr. 15, 2002 and including specification, claims, drawings and summary. The disclosure of the above Japanese Patent Application is incorporated herein by reference in its entirety.

What is claimed is:

1. A positional information management system comprising:
    a mobile terminal which receives gps (global positioning system) signals, measures acceleration, acquires acceleration data at a predetermined position and stores the acceleration data according to a communication state which is determined by the mobile terminal, and which derives a variable time cycle for notification as a function of the acceleration measured, the variable time cycle for notification becoming shorter as average velocity increases, and sends the notification in accordance with the variable time cycle when the variable time cycle is less than an elapsed time from a previous notification;
    a management server which is connected to said mobile terminal through a network and predicts a travel route of said mobile terminal based on information associated with traveling of the mobile terminal; and
    a communication system which specifies a current position of said mobile terminal and sends positional data representing the specified current position of the mobile terminal to said management server,
    wherein said management server:
    comprises a computer processing unit and memory, and
    is connected to a positional data storage unit which stores positional data representing that said mobile terminal is at a predetermined position, which is sent from said communication system in association with a reception time at which the positional data is received, and to an acceleration data storage unit which stores an acceleration log representing acceleration data in time series, which is stored by the mobile terminal and sent from said mobile terminal in association with a reception time at which the acceleration log is received,
    the management server being configured to:
    select positional data for two positions which are recorded adjacently time-wise in said positional data storage unit, and which are included in a travel route of the mobile terminal which is a target of prediction and which corresponds to identification information of the mobile terminal stored in connection with the positional data;
    determine whether or not positions represented by the selected positional data are positions of a notification point where a current position of said mobile terminal is to be notified; and
    extract an acceleration log whose reception time corresponds to a reception time of any of the selected positional data and predicts a travel route of said mobile terminal by specifying an intermediate position between notification points by the positional data which is notified to the management server based on a distance traveled from a start time at which the mobile terminal started to store the acceleration data represented by the acceleration log, which is derived from the extracted acceleration log and the selected positional data in a case where the positions represented by the selected positional data are determined not to be the position of the notification point,
    said mobile terminal being configured to:
    acquire the acceleration log, and store the acceleration log, in a case where the gps signals cannot be acquired at said mobile terminal; and
    send data regarding the position data of said mobile terminal and the acceleration log to said management server, in a case where gps signals are receivable and communication to said management server through the network becomes possible.

2. The positional information management system according to claim 1,
    wherein said management server:
    is further connected to a motion pattern data storage unit which stores a velocity pattern and an acceleration pattern for each means of transportation and configured to specify means of transportation used for traveling between the two positions, by deriving an average travel velocity between the two positions based on the selected positional data and their reception times and then comparing the average travel velocity with the velocity pattern stored in said motion pattern data storage unit, or by comparing the extracted acceleration log with the acceleration pattern stored in said motion pattern data storage unit.

3. A positional information management method for predicting a travel route of a mobile terminal, based on information associated with traveling of the mobile terminal, from a notification point at which a mobile terminal should notify that it is at the point, the notification point based on positional data representing a current position of said mobile terminal which acquires acceleration data at a predetermined position, and an acceleration log representing acceleration data in time series acquired and stored by said mobile terminal, the positional data and the acceleration log being notified through a predetermined network, said method comprising:
    measuring acceleration and receiving gps (global positioning system) signals with the mobile terminal;
    deriving a variable time cycle for notification as a function of acceleration measured, the variable time cycle for the notification becoming shorter as average velocity increases;
    sending the notification in accordance with the variable time cycle when the variable time cycle is less than an elapsed time from a previous notification;
    storing acceleration data according to a communication state determined by the mobile terminal;

storing, at a management server in the predetermined network, positional data and the acceleration log in association with times at which they are notified;

selecting, at the management server, positional data for two positions which are recorded adjacently time-wise, and which are included in a travel route of the mobile terminal which is a target of prediction and which corresponds to identification information of the mobile terminal stored in connection with the positional data;

determining, at the management server, whether or not positions represented by the selected positional data are positions of the notification point;

extracting, at the management server, an acceleration log corresponding to any of the selected positional data and predicting a travel route by specifying an intermediate position between notification points by the positional data based on a distance traveled from a start time at which the mobile terminal started to store the acceleration data represented by the acceleration log, which is derived from the extracted acceleration log and the selected positional data in a case where the positions represented by the selected positional data are determined not to be the position of the notification point;

measuring and storing, at the mobile terminal, the acceleration log in a case where the gps signals cannot be acquired at said mobile terminal; and sending, from the mobile terminal, data regarding the position of said mobile terminal and the acceleration log to the management server in a case where gps signals are receivable by the mobile terminal and communication through the network becomes possible.

4. The positional information management method according to claim 3, further comprising storing map data representing predetermined means of transportation, and places to get on and off the means of transportation, wherein:
the notification point includes the places to get on and off the means of transportation; and
said predicting the travel route includes specifying means of transportation which includes the notification point in its running course, by using the map data.

5. The positional information management method according to claim 3, wherein said predicting the travel route includes:
specifying the notification point based on the extracted acceleration log corresponding to the selected positional data, in a case where any of the selected positional data is not positional data representing the notification point; and
predicting the travel route based on positional data representing the notification point or based on the extracted acceleration log.

6. The positional information management method according to claim 5,
wherein said specifying the notification point specifies the notification point by:
deriving a travel distance based on the extracted acceleration log; and
searching for the notification point that exists within a radius of the derived travel distance from a position represented by the selected positional data from the map data.

7. The positional information management method according to claim 3, further comprising storing a velocity pattern for each predetermined means of transportation,
wherein said predicting the travel route specifies means of transportation by calculating an average travel velocity between the two positions based on the selected positional data and the times at which the positional data are notified, and by comparing the average travel velocity with the velocity pattern.

8. The positional information management method according to claim 3, further comprising storing an acceleration pattern for each predetermined means of transportation,
wherein said predicting the travel route specifies means of transportation by comparing the extracted acceleration log with the acceleration pattern.

9. A computer-readable storage medium encoded with instructions which, when executed by a computer causes the computer to implement a positional information management method for predicting a travel route of a mobile terminal, based on information associated with traveling of the mobile terminal, from a notification point at which a mobile terminal should notify that it is at the point, the notification point based on positional data representing a current position of said mobile terminal which acquires acceleration data at a predetermined position, and an acceleration log representing acceleration data in time series acquired and stored by said mobile terminal, the positional data and the acceleration log being notified through a predetermined network, said method comprising:
measuring acceleration and receiving gps (global positioning system) signals with the mobile terminal;
deriving a variable time cycle for notification as function of acceleration measured, the variable time cycle becoming shorter as average velocity increases;
sending the notification in accordance with the variable time cycle when the variable time cycle is less than an elapsed time from a previous notification;
storing acceleration data according to a communication state determined by the mobile terminal;
storing, at a management server in the predetermined network, positional data and the acceleration log in association with times at which they are notified;
selecting, at the management server, positional data for two positions which are recorded adjacently time-wise, and which are included in a travel route of the mobile terminal which is a target of prediction and which corresponds to identification information of the mobile terminal stored in connection with the positional data;
determining, at the management server, whether or not positions represented by the selected positional data are positions of the notification point;
extracting, at the management server, an acceleration log corresponding to any of the selected positional data and predicting a travel route by specifying an intermediate position between notification points by the positional data based on a distance traveled from a start time at which the mobile terminal started to store the acceleration data represented by the acceleration log, which is derived from the extracted acceleration log and the selected positional data in a case where the positions represented by the selected positional data are determined not to be the position of the notification point;
measuring and storing, at the mobile terminal, the acceleration log in a case where the gps signals cannot be acquired at said mobile terminal; and
sending, from the mobile terminal, data regarding the position of said mobile terminal and the acceleration log to the management server in a case where the gps signals are receivable by said mobile terminal and communication through the network becomes possible.

10. A mobile terminal connected with a management server through a network, the management server comprising a computer processing unit and memory, and configured to predict a travel route of the mobile terminal based on information associated with traveling of the mobile terminal and is connected to a storage unit which stores positional data representing that said mobile terminal is at a predetermined position, which is sent in association with a reception time at which the positional data is received, and an acceleration log representing acceleration data in time series, which is stored by the mobile terminal and sent from said mobile terminal in association with a reception time at which the acceleration log is received, the management server is configured to select positional data for two positions which are recorded adjacently time-wise in said storage unit, and which are included in a travel route of the mobile terminal which is a target of prediction and which corresponds to identification information of the mobile terminal stored in connection with the positional data;

determine whether or not positions represented by the selected positional data are positions of a notification point where a current position of said mobile terminal is to be notified; and extract an acceleration log whose reception time corresponds to a reception time of any of the selected positional data and predicts a travel route of said mobile terminal by specifying an intermediate position between notification points by the positional data which is notified to the management server based on a distance traveled from a start time at which the mobile terminal started to store the acceleration data represented by the acceleration log, which is derived from the extracted acceleration log and the selected positional data in a case where the positions represented by the selected positional data are determined not to be the position of the notification point, the mobile terminal comprising:

an acceleration measuring unit which contains an accelerometer to measure an acceleration and the acceleration measuring unit further storing the acceleration log;

a positional information acquiring unit which acquires gps (global positioning system) signals;

a control unit which controls said acceleration measuring unit and said positional information acquiring unit, said control unit derives a variable time cycle for a notification as a function of the acceleration measured, the variable time cycle for the notification becoming shorter as average velocity increases, and sends the notification in accordance with the variable time cycle when the variable time cycle is less than elapsed time from a previous notification; and a storage unit which stores the acceleration log, and which sends the acceleration log to the management server for managing the acceleration log, wherein said control unit is configured to:

determine whether or not data for specifying a position of said mobile terminal can be acquired by said positional information acquiring unit;

measure the acceleration log by said acceleration measuring unit and store the acceleration log in said storage unit, in a case where the gps signals cannot be acquired at said mobile terminal by said positional information acquiring unit; and send data regarding the position data of said mobile terminal acquired by said positional information acquiring unit and the acceleration log stored in said storage unit to said management server, in a case where the gps signals are receivable at said mobile terminal and communication to said management server through the network becomes possible.

* * * * *